455-618 AU 233 EX
FIP8106 OR 3,189,744

EXAMINER
230

June 15, 1965 J. W. OGLAND 3,189,744
235-285

OPTICAL COMMUNICATIONS TRANSMITTER

Filed Nov. 5, 1962 3 Sheets-Sheet 1

WITNESSES
Edwin E. Bassler
William L. Gates

INVENTOR
Jon W. Ogland
BY Ernest P. Klipfel
ATTORNEY

June 15, 1965 J. W. OGLAND 3,189,744

OPTICAL COMMUNICATIONS TRANSMITTER

Filed Nov. 5, 1962 3 Sheets-Sheet 2

United States Patent Office 3,189,744
Patented June 15, 1965

3,189,744

OPTICAL COMMUNICATIONS TRANSMITTER

Jon W. Ogland, Glen Burnie, Md., assignor to Westinghouse Electric Corporation, Pittsburgh, Pa., a corporation of Pennsylvania Filed Nov. 5, 1962, Ser. No. 235,285
13 Claims. (Cl. 250—199)

This invention relates to optical communications apparatus and more particularly to a transmitter for radiating optical energy which is modulated in accordance with an intelligence signal.

It is an object of the present invention, therefore, to provide a new and novel optical communications transmitter which radiates an omnidirectional beam in the horizontal plane, but is restricted in elevation to a predetermined acute angle.

It is another object of the present invention to provide a secure optical communications transmitter which radiates a non-visible omnidirectional radiation pattern.

It is still a further object of the present invention to provide a secure optical communications transmitter which operates preferably in the ultraviolet region of the optical spectrum.

Yet another object of the present invention is to provide transmitter means for optical communications which generates an omnidirectional radiation pattern in the horizontal plane, but is simultaneously restricted in elevation to an acute angle and which radiates a narrow spectrum of a modulated non-visible ultraviolet light.

Other objects and advantages will become apparent after a study of the following specification when read in connection with the accompanying drawings, in which.

The present invention provides a simple, reliable transmitter which can be used for secure communication between a central station and surrounding mobile stations such as from a flag ship of a naval fleet commander to his surrounding vessels and/or airplanes. The transmitter not only provides a secure means of communications, which prevents detection and jamming but radiates a beam which is substantially omnidirectional in the horizontal plane, but is restricted in elevation to a predetermined acute angle, for example 10 to 15 degrees.

The invention comprises means for producing a highly concentrated point source of radiation including means for modulating this source of radiation and means for directing the energy radiated therefrom in an omnidirectional pattern. Accordingly, a cathode ray device is provided to produce the required source of radiation. By proper selection of the phosphor contained in the cathode ray tube device, the radiation spectrum can be controlled to fit the requirements of the user. Since a secure communications transmitter is primarily desired, a phosphor emitting non-visible preferably ultraviolet radiation is utilized. This is not meant to be interpreted in a restricting sense, however, since it is possible that infrared radiation might be desired or if security is not required a phosphor emitting visible light can be utilized.

The phosphor is excited by a high voltage electron beam in a manner which is well known to those skilled in the art. Furthermore, phosphors are available which are capable of producing an instantaneous brightness of several million foot-lamberts. The limitation of power radiation capability lies in the temperature rise and heat dissipation possible.

The beam current of a cathode ray tube responds instantly to the grid voltage applied. The present invention utilizes this principle and the signal to be transmitted is impressed on the beam current by varying the grid voltage. By thus modulating the beam current the intensity of the radiation emitted from the phosphor is also modulated. In principle, the phosphor persistence limits the frequency at which the radiation may be modulated. Since phosphors like the well known P16 phosphor are available with a persistence of only a fraction of a microsecond, this limit will not be reached unless bandwidths in excess of about 5 megacycles are required.

A reflector system, hereinafter more fully described, is utilized in combination with the cathode ray tube device to provide the required omnidirectional radiation pattern while at the same time limiting the beamwidth in elevation to a predetermined value, for example 10 to 15 degrees.

Figures 1, 2:
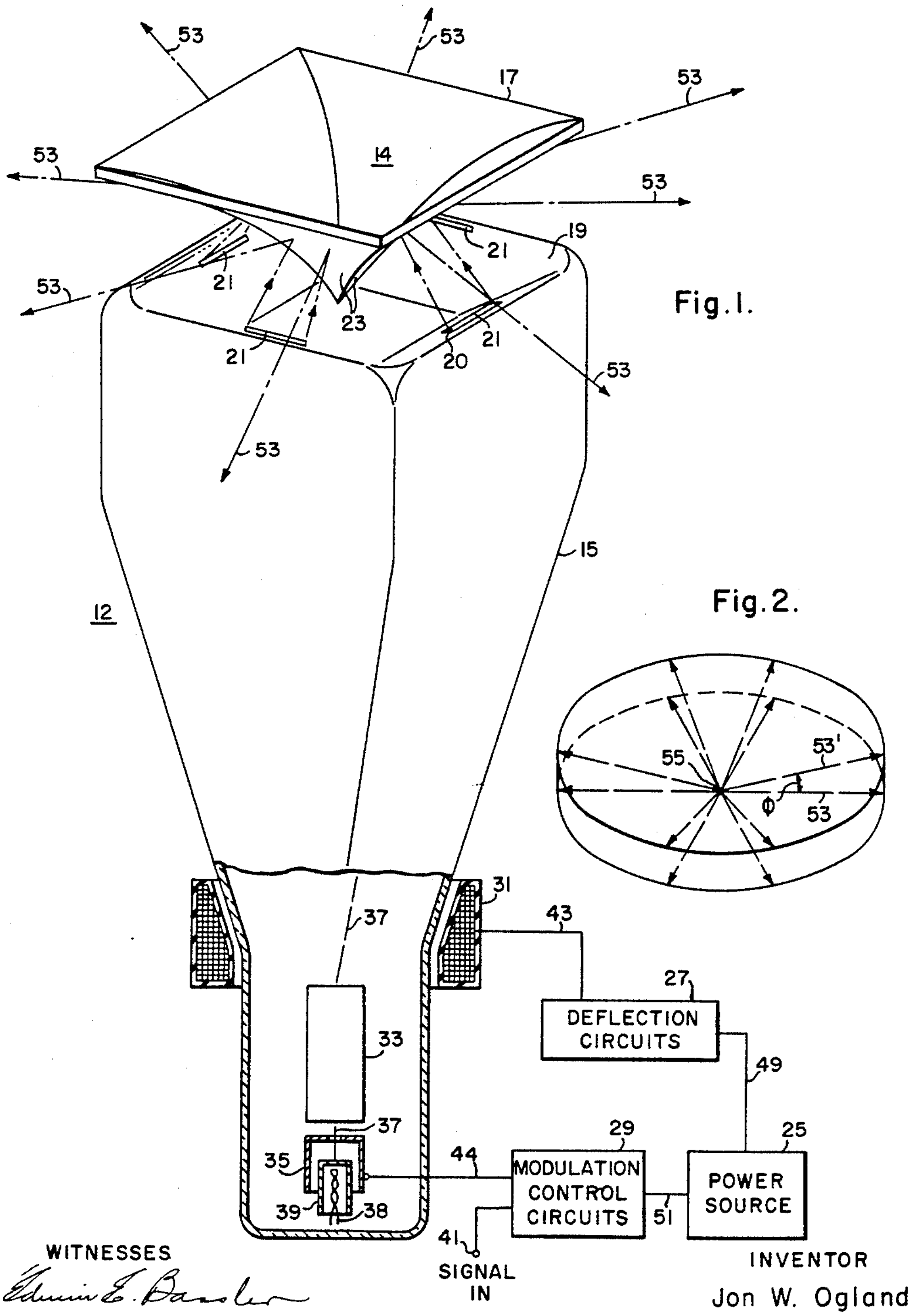
FIGURE 1 is an illustrative diagram of a first embodiment of the present invention.
FIG. 2 is a diagram illustrative of the radiation pattern provided by the subject invention.

Attention is now directed to a more detailed description of the subject invention by referring to FIG. 1 which is an illustrative diagram of a first embodiment of the subject invention. Shown therein is a cathode ray device 12 operated in combination with a reflector means 14. The cathode ray tube device 12 includes a square shaped bulb 15, a gun structure having a heater 38, a cathode 39, a control grid 35 and accelerating anodes 33. The gun structure generates an electron beam 37 which is directed toward the face 19 of the tube striking a phosphor screen, not shown, providing a trace 21 comprised of four line segments. The face 19 of the cathode ray tube 12, is depressed inwardly for purposes which will be explained subsequently. These areas describe four substantially rectangular areas on the tube face due to the fact that the bulb 15 is substantially square shaped and since the depression extends inwardly only a small distance with respect to side dimension of the bulb 15. Associated with the cathode ray tube device 12 is a deflection coil 31 surrounding the neck of the tube 15 wherein said deflection coils direct the cathode beam 37 to the face 19 for producing the trace 21. The deflection coil 31 is electrically connected to the deflection circuits 27 by means of suitable electrical connections 43. Alternatively electrostatic deflection may be used. The electron beam 37 is modulated by means of suitable modulation control circuits 29 connected to the control grid 35 by means of an electrical connection 44. The modulation control circuits 29 are also provided with an input terminal 41 wherein an audio or video, preferably audio input intelligence signal to be transmitted is applied. A power source 25 is included to provide suitable operating voltages to deflection circuits 27 and the modulation control circuits 29 and by means of electrical circuit means 49 and 51, respectively.

The reflector means 14 shown in FIG. 1 comprises a structure 17 having the shape of a four sided pyramid whose sides have mirror surfaces and are given a parabolic curvature instead of being flat. More particularly, the structure 17 has four concave parabolic faces intersecting at a common vertex which vertex is located so as to be centered on the tube face 19. The four concave parabolic mirror surfaces 23 reflect light emanating from the trace 21 outwardly in a horizontal plane in an omnidirectional pattern. Each of the four concave parabolic surfaces 23 have a focus lying outside of the pyramid structure which is so designed that the foci of the parabolic surfaces 23 lie substantially on the recessed portions of the tube face 19 so that the trace 21 emitting light therefrom is situated substantially coincident with the foci of the parabolic surfaces. Rays of light 53 are reflected from the parabolic surfaces 23 such that those rays lying at the focus of the parabolic surface will be radiated outwardly in a horizontal plane, however, light emanating from points not at the focal point will have a dispersion in the vertical plane determined by the distance away from the focus divided by the focal length of the parabolic face 23. In practice the dispersion is determined by the location of the trace 21 with respect to the location of the foci and the width of the trace.

In operation, the electron beam 37 is formed and focused by the electron gun structure and is deflected to the face 19 such that the deflection circuits 27 make the electron beam 37 sweep a line on each of the four depressed portions of the tube face 19. Voltage or current waveforms are produced therein such that the beam 37 either writes a full square trace or only the central parts of each side, as illustrated in FIG. 1, while the corner portions are skipped. For improved optical efficiency it is preferable that only the central segments of each side of the square trace be excited. The input signal to be transmitted is applied to terminal 41 and fed to the modulation control circuits 29 wherein the signal is fed to the control grid 35 which varies the intensity of the electron beam 37. The excited segments are accordingly emitting light energy which is intensity modulated with respect to the input signal to be transmitted.

Figure 7:
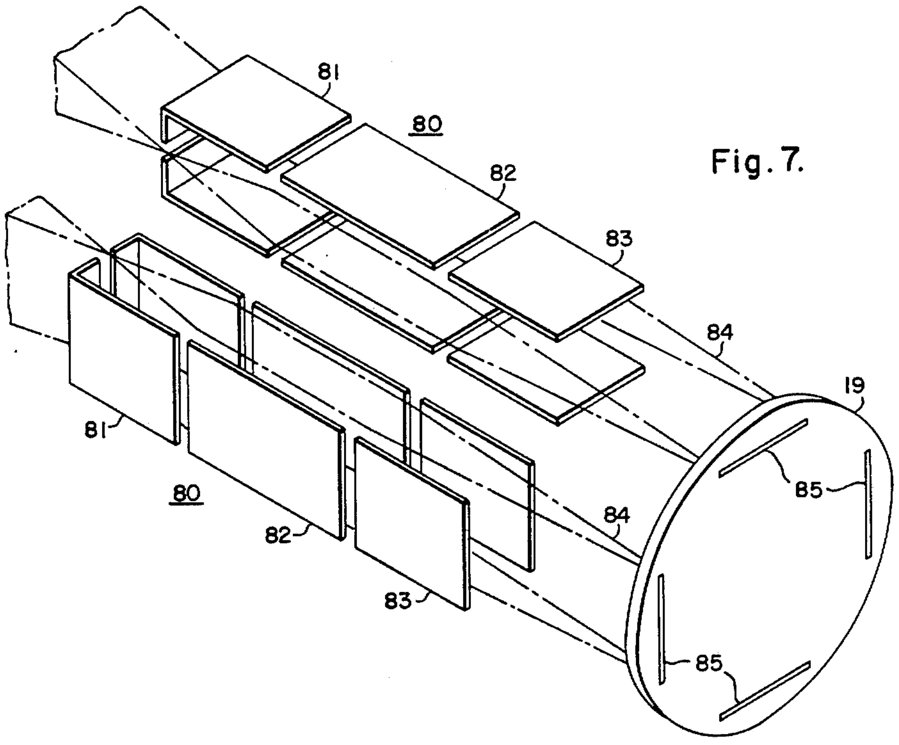
FIG. 7 illustrates a beam forming arrangement which may be used with the embodiment of FIG. 1.

The deflection circuits 27 control the beam 37 so that it writes successively on each side of the square or the segments thereof such that the beam jumps rapidly from one side to the next around the face of the tube. The trace thus described emits light energy depending upon the phosphor chosen which in the present invention preferably comprises a phosphor emitting ultraviolet light. The frequency of the sweep is high enough such that a substantially omnidirectional radiation pattern is produced in the horizontal plane which is perpendicular to the central axis of the cathode ray tube with the vertical beamwidth determined in elevation by the width of the trace described. Complete omnidirectional coverage at any instant is not obtained however, unless several beams are used simultaneously. Although the present embodiment shown in FIG. 1 utilizes one beam which sequentially sweeps each portion of the face 19, four beams may simultaneously be provided by utilizing four separate gun structures such as are illustrated in FIG. 7. These gun structures 80 produce beams 84 which need not be deflected by the usual magnetic or electrostatic methods. Instead each gun itself is aimed at the phosphor screen and is focused so as to excite lines 85 rather than circular spots on the phosphor. Since the embodiment of FIG. 1 utilizes a single electron beam 37, the repetition rate at which the trace 21 is scanned or swept the momentary interruptions will not affect the communication quality provided the repetition rate is at least twice the highest frequency contained in the modulation input signal to be transmitted. For communications of audio signals of telephone quality a repetition rate of proximately 7000 revolutions per second is satisfactory.

Considering the gun structures 80 in greater detail, it is a well known fact that a more or less elongated spot resembling a line may be produced on a cathode ray tube screen by the use af electronic astigmatism. With the ordinary electron gun, however, the amount of astigmatism is limited. By substituting the conventional cylindrical focusing electrodes with plane electrodes, 81, 82, and 83 the lens then becomes two dimensional instead of the usual three dimensional structure. By applying electrostatic focusing between these electrodes in one plane only the electrons will converge in this plane at the intersection with the phosphor screen. In the other plane, there is no electrostatic field and consequently no focusing. In this way, therefore, the electrons are allowed to spread out. The screen 19, consequently, is excited along a line 85 as desired although no deflection voltage is applied. To control the length of the line, the lateral spread can be restricted by closing the structure 80 on both sides with side pieces, not shown. A single cathode, not shown, with beam splitting may be utilized to supply electrons for all of the gun structures 80 shown in FIG. 7 or separate cathodes with respective control grids may be employed for individual excitation of each line 85.

The depressed portions of the cathode ray tube face 19 are provided in order to optimize radiation from the trace 21 to the parabolic mirror surfaces 23. The radiation is optimized in this manner due to the fact that the radiation from a phosphor is Lambertian i.e. the radiation pattern follows a cosine law. The highest interception efficiency of the reflector is therefore obtained where the phosphor surface is perpendicular to the center line or bisector of the angle subtended by the reflector.

FIG. 2 is a diagram further illustrating the radiation pattern provided by the subject invention. Since light is reflected from the four parabolic surfaces illustrated in FIG. 1 in a manner heretofore described, the light energy when viewed from an external position would appear to originate from a source behind the four parabolic surfaces 23 at a virtual image 55 within the parabolic pyramid of FIG. 1. Since all four sides are illuminated at a rapid rate an omnidirectional radiation pattern is thus produced with light rays appearing to emanate from a virtual image 55. Light rays emanating from the trace 21 of FIG. 1 which lie in the focus of the parabolic face 23 will be reflected in the horizontal plane as indicated by light rays 53. Light rays 53' are those which emanate from the trace which lie adjacent but not on the focal point of the parabolic face 23 and are consequently dispersed away from the horizontal by an angle $\phi$. The dispersion angle $\phi$ in the vertical plane is determined by the width of the trace divided by the focal length of the parabolic curvature of the face 23 of the reflector 17. Furthermore, if the trace 21 is written by means of a spot swept to describe a square pattern, the dispersion angle $\phi$ will be equal to the diameter of the spot on the phosphor divided by the focal length of the parabolic curvature of the face 23.

Figure 3:
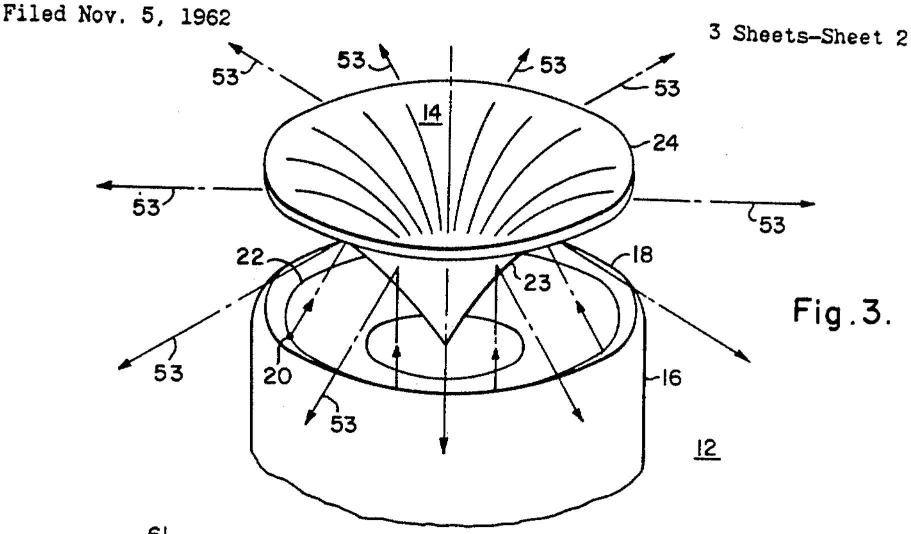
FIG. 3 is an illustrative diagram of second embodiment of the present invention.

FIG. 3 is an illustrative diagram of a second embodiment of the present invention in which the means shown in FIG. 1 have been modified. The second embodiment includes a cathode ray tube device 12 having a circular shaped bulb 16 and including a preselected phosphor, not shown, affixed to the circular face 18 which has a portion thereof depressed inwardly to a preselected depth. An optical reflective means 14 is included with the second embodiment, however, the reflective means comprises a conical shaped structure 24 whose surface 23 has a concave parabolic curvature. The conical shaped structure 24 can be considered to be a concave parabolic cone. The structure 24 is located with respect to the cathode ray tube device 12 such that the vertex of the parabolic cone points toward the tube face 18 and is coaxially located thereto. The parabolic conical structure 24 has an infinite number of focal points external of the concave parabolic surface 23 the locus of which would describe a circle of a predetermined diameter. The parabolic cone 24 moreover is located with respect to the cathode ray tube face 18 such that the locus of the focal points lie on the depressed area of the tube face 18.

A spot of light radiation 20 is generated on the phosphor, not shown, by means such as has been described with the embodiment shown in FIG. 1. With the difference that a circular trace 22 is described as the spot 20 is deflected around the depressed area of the cathode ray tube face 18. The trace 22, moreover, is controlled in order that it lies substantially in the locus of the focal points of the parabolic conical structure 24. The light energy emanating from the spot 20 as it is made to sweep the circular trace 22 is reflected from the continuous parabolic surface 23 in a manner to provide an omnidirectional beam in the horizontal plane as indicated by the reflected light rays 53 and wherein said beam has a dispersion of a predetermined angle in the elevation plane determined by the diameter of the spot 20 and the focal length of the parabolic conical structure 24.

Figure 4:
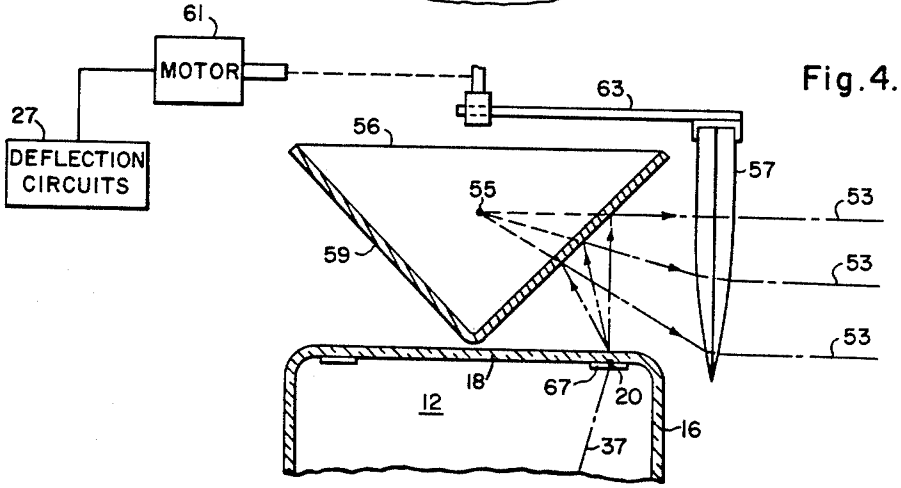
FIG. 4 is a cross sectional view of a third embodiment of the present invention.

FIG. 4 is a cross-sectional view of a third embodiment of the subject invention and resembles the embodiment of FIG. 3 except that the concave parabolic cone of FIG. 3 has been omitted and a conical structure 56 having a planar surface has been substituted. The cathode ray device 12, moreover, includes a circular bulb 16 and a face 18 which is planar rather than being depressed as shown in the embodiments of FIGS. 1 and 2. The conical structure 56 is located centrally with respect to the face 18 and the surface 59 is inclined at an angle of approximately 45° with respect to the cathode ray tube face 18. A lens means 57 is included in the third embodiment located in space relationship with the conical structure 56 to concentrate rays reflected from the surface 59 which will be explained in greater detail subsequently. The lens means is connected by suitable mechanical means 63 to a means for providing rotation such as an electrical motor 61 which is shown by way of example only. Other means for providing movement of the lens 57 around the conical surface 59 will become evident to those skilled in the art. Attached to the motor 61 is an electrical connection from the deflection circuits 27.

In operation, an electron beam 37 is deflected to a fluorescent screen 67 which includes a phosphor of required emission characteristics. A spot of light 20 having a predetermined diameter is produced thereat. Rays of light energy emanate from the spot 20 toward the reflective surface 59 and are reflected toward the lens means 57 which concentrates the light reflected therefrom into a substantially parallel beam. The parallel beam has a dispersion in the elevation plane which is determined by the focal length of the lens 57 and the diameter of the spot 20. The electron beam 37 is swept around the fluorescent screen 67 and the radiation appears to emanate from a virtual image 55 behind the surface 59. By synchronizing the rotation of the lens 57 around the tube face with the deflection circuits 27, the lens 57 is made to travel around in synchronism with the spot 20. The rate at which the lens 57 is rotated must be at least twice the highest frequency of the modulated signal to be transmitted. The lens means 57 shown in FIG. 4 may be varied according to the desires of the users, for example, a cassegrainian mirror system may be utilized.

Figure 6:
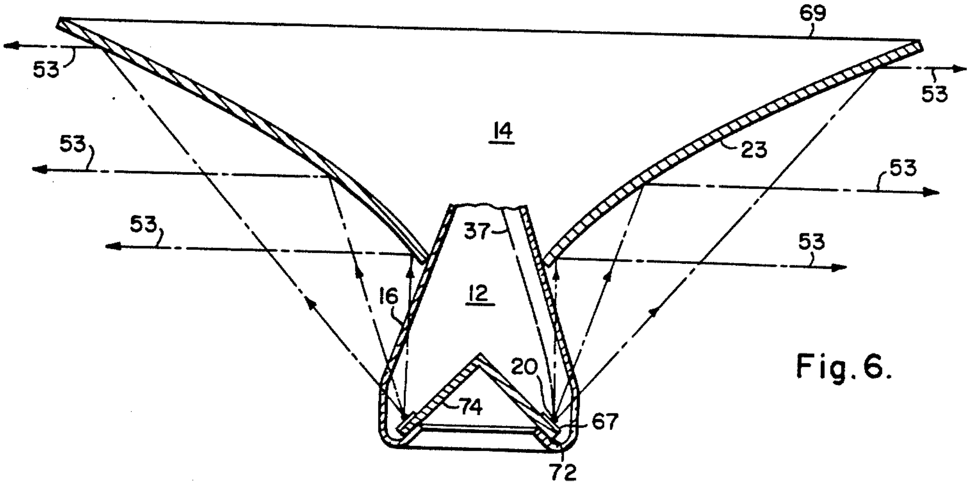
FIG. 6 is a fifth embodiment of the present invention and one which also utilizes a cathode ray tube having a metal substrate.
Figure 5:
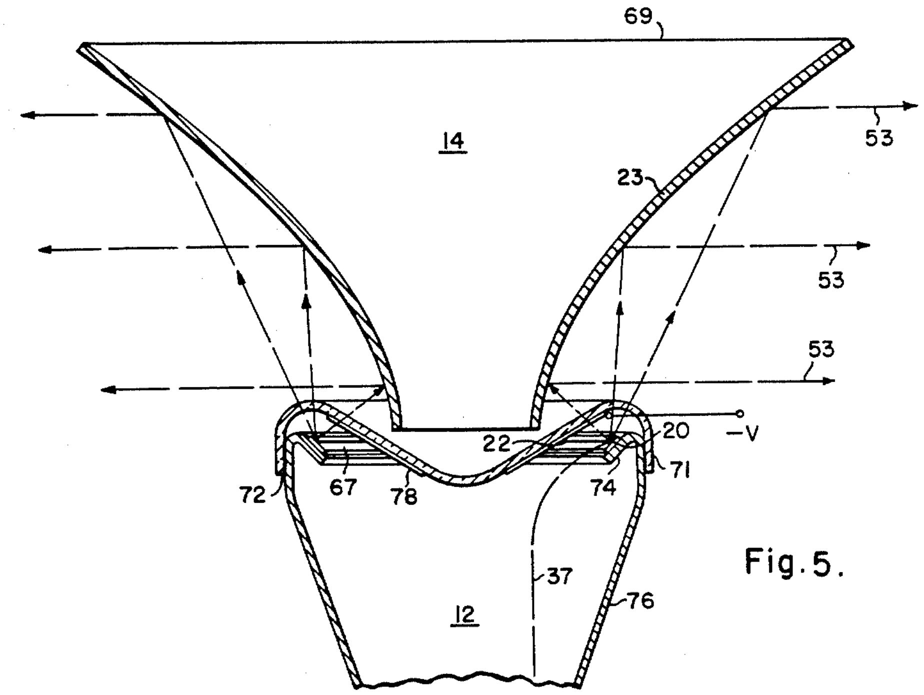
FIG. 5 is a cross sectional diagram of a fourth embodiment of the present invention wherein a cathode ray tube having a metal substrate is employed.

The limitation to power capability is primarily a matter of heat transfer in the phosphor and substrate on which the phosphor is deposited. In the embodiments of FIGS. 1 through 3 the substrate consisted of the glass face of the cathode ray tube 12. Excessive temperature rise must be prevented otherwise the power concentrated in the electron beam could melt a hole through the phosphor and substrate. The phosphor efficiency starts falling off at about 200° C. depending upon the type of phosphor utilized. A means of improving the heat conduction is to use a substrate of metal instead of glass. By the use of a metal substrate, the heat concentrated at the spot at which the electron beam strikes the phosphor is conducted away from the immediate vicinity of the spot. Two such embodiments are shown in FIGS. 5 and 6. FIG. 5 is a fourth embodiment of the subject invention and the first in which a metal substrate is used in the cathode ray tube device. The apparatus of FIG. 5 comprises a cathode ray tube device 12 having a metal wall bulb 76 with its end turned over to provide a metal substrate 74 for the application of a phosphor 67. In conjunction with the metal tube bulb is affixed a glass face plate 71 attached to the metal bulb and having a glass to metal seal 72 therebetween on the inner surface of the glass. On the face plate 71 is affixed a transparent conductive coating 78 having means for application of a negative voltage for the purpose of bending the electron beam 37 so that it can properly strike the phosphor 67. A parabolic reflector means 69 having the form of a truncated parabolic cone similar to that described in FIG. 3 is centrally located with respect to the center of the glass face plate 71 such that the smaller end points toward the face plate 71.

The electron beam 37 is modulated in accordance with the input signal to be transmitted and is deflected in a circular trace around the combination of phosphor 67 and metal substrates 74. The light emanating therefrom is reflected by the parabolic surface of the reflecting structure 69. The parabolic surface 23 is designed such that the focal point lies substantially coincident with the trace swept on the phosphor 67. The reflected rays 53 from the parabolic surface radiate outwardly in a horizontal plane substantially parallel but having a dispersion in the vertical plane of a magnitude determined by the ratio of the magnitude of the spot excited on the phosphor by the electron beam and the focal length of the parabolic reflecting surface.

FIG. 6 is a fifth embodiment of the present invention and one which utilizes metal substrate similar to the embodiment described in FIG. 5. However, the present embodiment utilizes the principle of backward radiation, that is, light is reflected back through the side wall 16 of a cathode ray tube device 12 rather than being radiated in a forward direction. In this embodiment, a cathode ray tube device comprising a glass wall bulb 16 has a metal substrate 74 affixed to the portion normally described as the face plate. The metal substrate 74 is of a conical shape located along the central axis of the tube and is affixed to the glass bulb 16 by means of a glass to metal seal 72. On the inner surface of the metal substrate 74 is affixed a phosphor 67 which can then be struck by the electron beam 37. Around the neck portion of the cathode ray tube device is located a parabolic reflecting structure 69. The reflecting structure 69 is located along the neck of the cathode ray tube such that the focal point or the locus of the focal points of the parabolic surface will lie along the phosphor 67 affixed to the metal substrate 74. Again as in the previous embodiments, the electron beam strikes the phosphor 67 emitting light which is reflected from the parabolic reflector 69 in substantially a horizontal plane. By deflecting the beam around the metal substrate and phosphor, an omnidirectional beam is generated which is modulated in intensity according to the intelligence signal impressed upon the electron beam in a manner heretofore described as in FIG. 1. The dispersion angle in the elevation plane can be controlled by positioning the parabolic mirror with respect to the phosphor according to the aforementioned relationship of the diameter of the spot produced on the phosphor 67 and the focal length of the parabolic structure 69.

What has been described, therefore, is optical transmitter apparatus providing a radiation pattern which is omnidirectional in the horizontal plane and which has a narrow beamwidth in the elevation plane. Non-visible optical radiation is preferably used whereby enemy detection and interception is avoided although visible radiation can be used where security is not required. The cathode ray tube device, furthermore, can be modulated by a signal to transmit frequencies covering the audio and video range with the inherent quality of requiring little or no driving power. The apparatus described is rugged and its operation independent of environmental temperature.

Although the present invention has been described with a certain degree of particularity, it should be understood that the present disclosure has been made only by way of example and that numerous changes in the details of the apparatus may be resorted to without departing from the scope and the spirit of the present invention.

I claim as my invention:

1. An optical communications transmitter comprising in combination: a cathode ray tube apparatus including an electron beam, a screen emitting a narrow spectrum of light radiation when bombarded by said electron beam and beam forming means for focusing and positioning said electron beam on said phosphor screen; means for modulating said electron beam in accordance with an intelligence signal to be transmitted whereby said radiation is amplitude modulated; optical means proximately located to said screen for directing said radiation outwardly from said screen, said optical means acting in combination with said electron beam to generate a substantially omnidirectional beam in a horizontal plane and simultaneously restricting the scattering of said light in the elevation plane to a predetermined acute angle.

2. A secure optical radiation transmitter for communications purposes comprising in combination: cathode ray tube apparatus including an electron beam, beam focus and positioning means, and screen having a predetermined radiation characteristic for emitting a narrow spectrum of invisible light when struck by said electron beam; means for modulating said electron beam with an input signal corresponding to the intelligence to be transmitted wherein said invisible light is modulated in intensity; optical reflective means proximately located to said screen for directing said invisible light outwardly from said screen, said reflective means acting in combination with said electron beam to provide a substantially omnidirectional radiation pattern of light energy in a horizontal plane with respect to the earth's surface and including means for restricting the said radiation in the vertical plane to a predetermined acute angle of beamwidth.

3. An optical communications transmitter comprising in combination; cathode ray tube apparatus including a plurality of electron beams, a screen emitting a narrow spectrum of light radiation when bombarded by said electron beams and beam forming means comprising a plurality of plane electrode gun structures for focusing and positioning a plurality of beams on said phosphor screen; means for modulating said electron beams in accordance with an intelligent signal to be transmitted whereby said radiation is amplitude modulated; optical means proximately located to said screen for directing said radiation outwardly from said screen, said optical means acting in combination with said electron beams to generate a substantially omnidirectional beam in a horizontal plane and simultaneously restricting the scattering of said light in the elevation plane to a predetermined acute angle.

4. Apparatus of claim 3 wherein said screen includes a phosphor for emitting ultraviolet light.

5. A secure optical communications transmitter comprising in combination; cathode ray tube apparatus including an electron beam and a screen having a phosphor radiating invisible light predominately in the ultraviolet region of the optical spectrum when bombarded by said electron beam; means for intensity modulating said invisible light in accordance with an intelligence input signal to be externally transmitted; focus and deflection means for causing electron beam to scan a predetermined trace on said phosphor screen; optical reflector means proximately located to said phosphor screen for forming said invisible light into a beam of energy and directing said energy outwardly from said screen, said reflector means providing a radiation pattern substantially omnidirectionally in the horizontal plane while restricting radiation in the elevation plane to a predetermined acute angle less than 45° with the horizontal plane.

6. A transmitter for communications in the optical region of the electromagnetic spectrum comprising in combination: cathode ray tube apparatus having an electron beam, a screen emitting a narrow spectrum of light radiation when bombarded by said electron beam, and focusing and deflecting means for causing said electron beam to scan a predetermined area on said fluorescent screen; means for modulating said electron beam in accordance with an intelligence signal to be transmitted, said light radiation being modulated in intensity thereby; optical reflector means having a pyramidal shape with a plurality of faces each having a concave parabolic surface, said reflector means being proximately located to said screen for directing said light radiation outwardly therefrom, the combination of said light radiation and said reflector means generating a light beam when said screen is scanned to provide a substantially omnidirectional beam in a horizontal plane but restricting radiation in a vertical plane to a predetermined beamwidth.

7. The apparatus of claim 6 wherein the screen includes a phosphor for emitting ultraviolet light energy.

8. A secure communications transmitter operative in the optical region of electromagnetic spectrum comprising in combination: a cathode ray tube having an electron beam, a screen including a preselected phosphor for emitting a narrow spectrum of invisible light energy when struck by said electron beam and means operable with said cathode ray tube for controlling the point at which said electron beam strikes said screen, thereby causing said electron beam to scan a predetermined trace on said screen; means for modulating said electron beam in accordance with an intelligence input signal whereby said light energy is intensity modulated, reflective means located in front of said screen for gathering and beaming said light energy outwardly therefrom, said reflector means having a base plane and plurality of concave parabolic sides intersecting at a common vertex, said vertex being directed toward said screen whereby the said light energy is directed outwardly in a horizontal plane in substantially parallel rays with a predetermined acute dispersion angle in the vertical plane and generating an omnidirectional pattern in the horizontal plane as said electron beam scans said trace on said fluorescent screen.

9. A secure optical communications transmitter comprising in combination a cathode ray tube having an electron source, beam forming means for producing an electron beam and a screen including a preselected phosphor producing a spot of invisible light radiation of a predetermined diameter, when said screen is struck by said beam; means for modulating said electron beam in accordance with an intelligence signal to be transmitted and wherein said radiation is modulated in intensity in accordance with the modulation of said electron beam; deflection means operable with said cathode ray tube for causing said electron beam to scan a polygonal pattern on said screen; optical reflector means located adjacent to said screen, said reflector means comprising a pyramidal structure having a plurality of sides of concave parabolic curvature having a predetermined focal length, said reflective means acting in combination with said radiation to provide a substantially omnidirectional beam in a horizontal plane and simultaneously restricting radiation in the vertical plane to an acute angle dependent on the magnitude of said diameter of said spot of light divided by the focal length of said parabolic curvature.

10. A secure optical communications transmitter comprising: cathode ray tube apparatus including electron beam means, a screen emitting a narrow spectrum of invisible light energy including ultraviolet light and focus and deflection means acting in combination with said electron beam means for modulating said electron beam means in accordance with an intelligence signal whereby said light energy is modulated in intensity with respect to said intelligence signal; means to describe a trace on said screen of four line segments defining a substantially square pattern; optical reflector means having four triangular shaped sides meeting at a vertex, said four sides having a concave parabolic surface of a predetermined focal length said reflective means being located proximately to said phosphor screen such that said vertex lies along the central axis of said cathode ray tube adjacent to said screen and positioned away from said screen substantially a focal length from said trace, said reflective means acting in combination with said trace to direct said invisible light energy in a substantially omnidirectional beam in a first plane perpendicular to the central axis of said cathode ray tube and simultaneously restricting radiation in a second plane parallel to said central axis to an acute angle substantially less than 45°.

11. An optical communications transmitter comprising in combination: cathode ray tube apparatus including an electron beam, a screen emitting a narrow spectrum of invisible light radiation from a spot of predetermined diameter when said electron beam strikes said screen, and focus and deflection means for causing said spot to scan a substantially circular trace on said screen; and optical reflector means having a predetermined focal length and being in the form of a parabolic cone being located coincident with the center line of said screen for directing said light radiation outwardly from said spot, said reflector means acting in combination with said circular trace to provide a radiation pattern substantially omnidirectionally in the horizontal plane and restricted in the vertical plane to a predetermined acute angle with respect to the horizontal plane, said acute angle being determined by the relationship of the diameter of said spot divided by said focal length.

12. A secure optical communications transmitter comprising in combination: cathode ray tube apparatus having an electron beam and a screen emitting a narrow spectrum of invisible light including ultraviolet light when said phosphor is struck by said electron beam; means for modulating said electron beam in accordance with an intelligence input signal which is to be transmitted whereby said invisible light is amplitude modulated in intensity; deflection means associated with said cathode ray tube apparatus for deflecting said electron beam in a manner to describe a substantially circular path of predetermined dimensions on said screen; reflective optical means comprising a structure having a concave parabolic surface, said structure being a truncated parabolic cone wherein the smaller end thereof is located nearer said cathode ray tube apparatus, said parabolic surface having a focus a predetermined distance away from said surface and situated substantially on said circular path described on said screen directing said invisible light outwardly to produce a omnidirectional beam of radiation a plane substantially perpendicular to the central axis of the cathode ray tube but restricted in the plane parallel to the central axis of the cathode ray tube to a predetermined acute angle.

13. A secure optical communications transmitter comprising in combination: cathode ray tube apparatus having an electron beam and a screen emitting a predetermined spectrum of ultraviolet light radiation when said screen is struck by said electron beam forming a spot of predetermined diameter thereon; means for modulating said electron beam by an intelligence signal for modulating the light radiation in intensity according to said intelligence signal, deflection means for controlling the movement of said spot on said screen in a manner to scan a predetermined trace thereon; first optical reflector means coaxially located to said phosphor screen comprising a conical structure having a vertex, said vertex being pointed toward said screen for directing light emanating from said spot outwardly in a horizontal plane; a second optical means comprising lens means located adjacent to said first optical means for gathering light reflected therefrom and concentrating the radiation into a beam in the vertical plane of having a beamwidth equal to the diameter of said spot produced on said screen divided by the focal length of said lens means, said second optical means including means for following the movement of said spot as it is controlled by said deflection means.

References Cited by the Examiner

UNITED STATES PATENTS

| | | | |
|---|---|---|---|
| 2,251,332 | 8/41 | Gray | 250—199 |
| 2,412,320 | 12/46 | Carter | 343—781 |
| 2,416,698 | 3/47 | King | 343—781 |
| 2,549,143 | 4/51 | Tinue | 343—781 |
| 2,873,381 | 2/59 | Lauroesch | 88—72 |
| 2,921,309 | 1/60 | Elliott | 343—781 |
| 2,942,260 | 6/60 | Carter | 343—781 |
| 2,999,163 | 9/61 | Beese | 250—199 |

FOREIGN PATENTS

| | | |
|---|---|---|
| 10,701 | 5/06 | Great Britain. |

DAVID G. REDINBAUGH, *Primary Examiner.*